United States Patent
Zehavi (12)

(10) Patent No.: US 6,185,199 B1
(45) Date of Patent: Feb. 6, 2001

(54) METHOD AND APPARATUS FOR DATA TRANSMISSION USING TIME GATED FREQUENCY DIVISION DUPLEXING

(75) Inventor: Ephraim Zehavi, Haifa (IL)

(73) Assignee: Qualcomm Inc., San Diego, CA (US)

( * ) Notice: Under 35 U.S.C. 154(b), the term of this patent shall be extended for 0 days.

(21) Appl. No.: 08/899,412

(22) Filed: Jul. 23, 1997

(51) Int. Cl.[7] .................................................. H04B 7/216
(52) U.S. Cl. .......................... 370/335; 375/146; 375/147
(58) Field of Search ..................................... 370/335, 342, 370/276, 280, 281, 468; 375/140, 146, 147

(56) References Cited

U.S. PATENT DOCUMENTS

| | | |
|---|---|---|
| 4,901,307 | 2/1990 | Gilhousen et al. . |
| 5,027,372 * | 6/1991 | Wong .................... 375/308 |
| 5,101,501 | 3/1992 | Gilhousen et al. . |
| 5,103,459 | 4/1992 | Gilhousen et al. . |
| 5,109,390 | 4/1992 | Gilhousen et al. . |
| 5,267,261 | 11/1993 | Blakeney, II et al. . |
| 5,390,166 * | 2/1995 | Rohani et al. ............... 370/335 |
| 5,416,797 * | 5/1995 | Gilhousen et al. .......... 370/209 |
| 5,490,165 * | 2/1996 | Blankeney, II et al. ..... 375/205 |
| 5,497,395 * | 3/1996 | Jou ................................. 375/205 |
| 5,504,773 | 4/1996 | Padovani et al. . |
| 5,583,851 | 12/1996 | Kato et al. .................. 370/342 |
| 5,619,526 * | 4/1997 | Kim et al. .................. 370/335 |
| 5,625,876 * | 4/1997 | Gilhousen et al. .......... 370/331 |
| 5,724,385 * | 3/1998 | Levin et al. ................. 375/222 |
| 5,764,687 | 6/1998 | Easton . |
| 5,768,307 * | 6/1998 | Schramm et al. .......... 375/208 |
| 5,872,774 * | 2/1999 | Wheatley, III et al. ..... 370/335 |
| 5,991,284 * | 11/1999 | Willenegger et al. ....... 370/335 |

FOREIGN PATENT DOCUMENTS 9740592  10/1997  (WO) .............................. H04B/7/26

* cited by examiner

Primary Examiner—Melvin Marcelo
Assistant Examiner—Phuongchau Ba Nguyen
(74) Attorney, Agent, or Firm—Gregory D. Ogrod; Thomas M. Thibault

(57) ABSTRACT

In a time gated frequency division duplexing (FDD) data communication system, the base station transmits two data frames on the forward link to the first remote station and receives two data frames on the reverse link from the second remote station at the first time frame. At the second time frame, the base station transmits two data frames to the second remote station and receives two data frames from the first remote station. Data transmission and reception alternate over consecutive time frames. On the forward link, each data frame is covered with a unique Walsh code. The data is also spread with the short $PN_I$ and $PN_Q$ codes in accordance with the IS-95A standard. The data can be scrambled by the long PN code. The base station delays the long PN code and short PN codes and properly loads the Walsh codes so that the processed data can be properly demodulated and descrambled by the destination remote station.

16 Claims, 7 Drawing Sheets

METHOD AND APPARATUS FOR DATA TRANSMISSION USING TIME GATED FREQUENCY DIVISION DUPLEXING

BACKGROUND OF THE INVENTION

I. Field of the Invention

The present invention relates to data communication. More particularly, the present invention relates to a novel and improved method and apparatus for data transmission using time gated frequency division duplexing (FDD).

II. Description of the Related Art

A communication system is typically required to support multiple users sharing the same resources. One such communication system is a code division multiple access (CDMA) system which conforms to the "TIA/EIA/IS-95A Mobile Station-Base Station Compatibility Standard for Dual-Mode Wideband Spread Spectrum Cellular System", hereinafter referred to as the IS-95A standard. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein.

The CDMA system is a spread spectrum communication system. The benefits of spread spectrum communication are well known in the art and can be appreciated by reference to the above cited references. The CDMA system is designed to work within the pre-existing non-contiguous frequency allocation in the cellular band. By design, a CDMA system which conforms to IS-95A standard is allotted a 1.2288 MHz bandwidth to fully utilize the cellular band.

The CDMA system is capable of transmitting data traffic and voice data over the forward and reverse links. A method for transmitting data traffic in code channel frames of fixed size, wherein the data source provides data at a variable rate, is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. In accordance with the IS-95A standard, the data traffic or voice data is partitioned into code channel frames which are 20 msec wide.

In the CDMA system, users communicate with one another through remote stations which, in turn, communicate with each other through one or more base stations. In this specification, base station refers to the hardware with which the remote stations communicate. Cell refers to the hardware or the geographic coverage area, depending on the context in which the term is used. A sector is a partition of a cell. Because a sector of a CDMA system has the attributes of a cell, the teachings described in terms of cells are readily extended to sectors.

In the CDMA system, communications between users are conducted through one or more base stations. A first user on one remote station communicates to a second user on a second remote station, or a standard telephone, by transmitting data on the reverse link to a base station. The base station receives the data and can route the data to another base station or a public switched telephone network (PSTN). If the second user is on a remote station, the data is transmitted on the forward link of the same base station, or a second base station, to the second remote station. Otherwise, the data is routed through the PSTN to the second user on the standard phone system. The forward link refers to transmission from the base station to a remote station and the reverse link refers to transmission from the remote station to a base station. In IS-95A systems, the forward link and the reverse link are allocated separate frequencies and are independent of one another.

The remote station communicates with at least one base station during a communication. CDMA remote stations are capable of communicating with multiple base stations simultaneously during soft handoff. Soft handoff is the process of establishing a link with a new base station before breaking the link with the previous base station. Soft handoff minimizes the probability of dropped calls. The method and system for providing a communication with a remote station through more than one base station during the soft handoff process are disclosed in U.S. Pat. No. 5,101,501 entitled "SOFT HANDOFF IN A CDMA CELLULAR TELEPHONE SYSTEM", and U.S. Pat. No. 5,267,261, entitled "MOBILE ASSISTED SOFT HANDOFF IN A CDMA CELLULAR TELEPHONE SYSTEM," both assigned to the assignee of the present invention and incorporated by reference herein. Softer handoff is the process whereby the communication occurs over multiple sectors which are typically serviced by the same base station. The process of softer handoff is described in detail in U.S. patent application Ser. No. 08/405,611, entitled "METHOD AND APPARATUS FOR PERFORMING HANDOFF BETWEEN SECTORS OF A COMMON BASE STATION", filed Mar. 13, 1995, assigned to the assignee of the present invention and incorporated by reference herein.

In softer handoff, the base station transmits identical forward link signals over multiple sectors of the same cell. Because the base stations serving the sectors are physically located at the same location, one common set of hardware can be designed to support softer handoff at the base station.

The signal transmitted by the base station or the remote station can reach the destination device through one or more propagation paths.

Furthermore, in soft handoff the forward link signals are transmitted from multiple base stations. The demodulation of multiple code channels during soft handoff and of multipath signals is described in detail in U.S. Pat. No. 5,109,390, entitled "DIVERSITY RECEIVER IN A CDMA CELLULAR TELEPHONE SYSTEM", and U.S. Pat. No. 5,490,165, entitled "DEMODULATION ELEMENT ASSIGNMENT IN A SYSTEM CAPABLE OF RECEIVING MULTIPLE SIGNALS", both assigned to the assignee of the present invention and incorporated by reference herein.

The diversity receiver disclosed in U.S. Pat. No. 5,109,390 is also referred to as a rake receiver. The rake receiver contains multiple fingers with each finger comprising one correlator. At the remote station, each correlator has the capability to despread the received baseband signal with a unique set of short PN codes and a unique Walsh code which are assigned to that particular correlator by the remote station. Not all correlators are in use at all times. In fact, only the outputs from the correlators which have been assigned by the remote station are combined by a combiner to provide a more reliable estimate of the transmitted signal. The combined signal is then decoded by a subsequent decoder.

At the remote station, the same rake receiver can be used to demodulate multiple signals from soft handoff and softer handoff. The only difference to the remote station is that in softer handoff, the base stations are configured to send identical reverse link power control bit values to the remote station since the base stations are physically situated at the same location. The power control bit commands the remote station to adjust its transmit power up or down to maintain the desired level of performance while minimizing the level of interference to other users. In soft handoff, the base stations do not send the same power control bit values because they are typically situated at different locations. This difference can be accounted for in the design of the rake receiver. In the exemplary embodiment, combiner 180 coherently combines the scalar outputs which correspond to the data Application specific integrated circuits (ASICs) have been designed to support soft and softer handoff for the base station and the remote station. An example of a remote station ASIC which supports soft handoff is the Qualcomm Q5257 Mobile Station Modem (MSM). A base station ASIC capable of supporting softer handoff is the Qualcomm Q5160 Cell Site Modem (CSM). The design and capabilities of these ASICs are disclosed in U.S. patent application Ser. No. 08/492,592 entitled "MOBILE DEMODULATOR ARCHITECTURE FOR A SPREAD SPECTRUM MULTIPLE ACCESS COMMUNICATION SYSTEM", filed Jun. 20, 1995, and U.S. patent application Ser. No. 08/572,632 entitled "CELL SITE DEMODULATOR ARCHITECTURE FOR A SPREAD SPECTRUM MULTIPLE ACCESS COMMUNICATION SYSTEM", filed Jan. 13, 1995, both assigned to the assignee of the present invention and incorporated herein by reference.

In the exemplary CDMA communication system, data transmission occurs concurrently on the forward link and the reverse link. This is possible since the forward link and the reverse link are allocated separate transmission frequencies. Concurrent transmission and reception can require additional hardware which can be simplified or eliminated through a time gated transmission scheme. Furthermore, concurrent transmission and reception may not be possible if separate frequencies do not exist.

SUMMARY OF THE INVENTION

The present invention is a novel and improved method and apparatus for data transmissions using time gated frequency division duplexing (FDD). The present invention simplifies the hardware requirement and improves reliability by multiplexing data transmission and reception. At the first time frame, the base station transmits two data frames on the forward link to the first remote station and receives two data frames on the reverse link from the second remote station. At the second time frame, the base station transmits two data frames to the second remote station and receives two data frames from the first remote station. At the base station, data transmissions to the two remote stations alternate over consecutive time frames. At the base station and remote stations, data transmission and reception alternate over consecutive time frames.

In the present invention, transmission of two data frames on the forward link can be accomplished by covering each data frame with a unique Walsh code. The data is also spread with the short $PN_I$ and $PN_Q$ codes in accordance with the IS-95A standard. The data may also be spread with the long PN code. Depending on the implementation of the hardware, the base station can load the proper Walsh codes, short PN codes, and long PN code at the start of the data communication or at each data frame. Furthermore, the base station may need to delay the short PN codes and the long PN code to match the delay of the data.

It is an object of the present invention to simplify the hardware requirement of a data communication system and to improve reliability.

Since data transmission and reception are not performed concurrently, the hardware can be simplified to save cost and reduce size and component count.

For example, the duplexer can be eliminated. At the remote station, elimination of the duplexer can save on component cost, improve reliability, reduce power consumption, and reduce the size and weight of the unit. This is particularly important when the remote station is a mass produced portable unit where the benefits listed above are important considerations.

It is another object of the present invention to provide for time gated FDD data transmissions having the efficiency and capacity approaching that of the nominal CDMA system. In the present invention, two data frames are transmitted at alternate time frames to a remote station. The present invention can provide for a short transition period between data transmissions. During this period, the base station can transmit an amplified pilot signal to assist the remote station achieve lock. The transition period also allows the hardware time to alternate between the transmission and reception states. The period can be made short to minimize the down time.

It is yet another object of the present invention to provide for time gated FDD data transmissions using existing CDMA hardware. Currently, many of the functions required by a CDMA system are provided by a set of custom ASICs. For example, the encoding and modulation functions at the base station are provided by a Base Station Modulator (BSM) ASIC. Similarly, the demodulation and decoding of the forward link signal at the remote station are provided by a Mobile Station Modulator (MSM) ASIC. In several embodiments of the present invention, the existing BSM and MSM ASICs are utilized to provide the majority of the required functions. Minimal additional circuitry is added to provide the remaining functions.

It is yet another object of the present invention to provide a full duplex CDMA communication system when independent forward link and reverse link frequencies are not available. Since the transmission and reception are time gated, it is possible to share one common frequency to provide a full duplex communication between the base station and the remote station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In accordance with the communication system of the present invention, data transmission occurs from the base station to the remote station (see FIG. 1) in a time gated manner. Data transmission occurs over discrete time intervals referred to as a time frame. In the exemplary embodiment, each time frame is 20 msec in duration. At time frame n, the base station transmits two data frames to the first remote station and receives two data frames from the second remote station. At time frame n+1, the base station transmits two data frames to the second remote station and receives two data frames from the first remote station. By time multiplexing the transmit and receive functions, the hardware design can be simplify to reduce cost and improve reliability. For example, the duplexer within the remote station can be eliminated if data transmission and reception are not performed concurrently. Furthermore, time gated frequency division duplexing (FDD) allows for a full duplex communication system when separate transmission frequencies are not available.

In the exemplary embodiment, data transmissions occur over alternating time frames but two data frames are transmitted at each time frame. Thus, the overall efficiency of the data communication system is approximately equal to that of the conventional full duplex CDMA system wherein data transmission and reception occur concurrently at the nominal rate of one data frame per time frame.

On the forward link, two data frames can be transmitted concurrently by covering each data frame with its own unique Walsh code. In the exemplary CDMA system, each forward traffic channel is identified by a unique Walsh code. Walsh covering provides orthogonality of the forward link traffic channels and minimizes the amount of interference from one channel to another.

The data is spread with the short $PN_I$ and $PN_Q$ codes before transmission. The short PN codes are used to spread the signal over the system bandwidth and provide for base station identification. In the exemplary embodiment, the short PN codes are of length 215 and are defined in accordance with the IS-95A standard. In the exemplary embodiment, each base station is assigned unique short PN sequences which are offset by multiples of 64 chips from those of adjacent base stations.

The data can be further spread with the long PN code before transmission. The long PN code identifies a particular remote station for which the transmission is destined and only the remote station with the identical long PN sequence is able to demodulate the signal. In the exemplary CDMA system, each remote station is identified by a unique temporal offset of a common long PN sequence of length $2^{42}$. In the exemplary embodiment, the long PN sequence is defined in accordance with IS-95A standard. At two different offsets, the resulting modulation sequences are uncorrelated. Demodulation with a long PN sequence having an incorrect offset results in a minimal output value.

Figure 1:
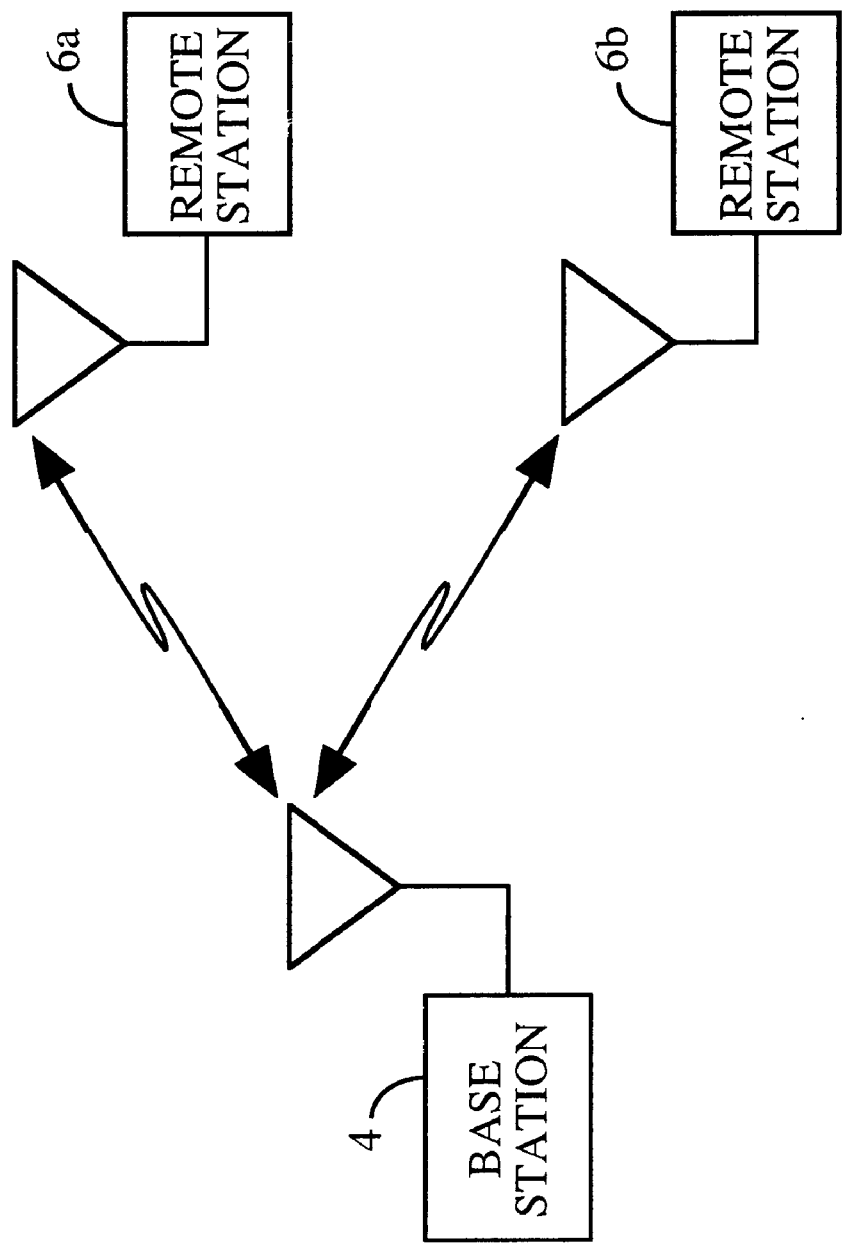
FIG. 1 is an exemplary diagram of a data communication system of the present invention comprising a base station and two remote stations.

Referring to the figures, FIG. 1 represents the exemplary communication system of the present invention which is composed of multiple base station 4 and multiple remote stations 6. One such system is the CDMA system which conforms to the IS-95A standard. Only one base station 4 and two remote stations 6 are shown in FIG. 1 for simplicity. Base station 4 transmits and receives communication using time gated FDD. As such, base station 4 transmits to one remote station 6 at one time frame and receives from the same remote station 6 at a second time frame. The transmission and reception alternates over consecutive time frames. Time gated FDD can be further expanded to cover transmission from multiple base stations 4 to multiple sets of remote stations 6, as described below.

In the present invention, time gated FDD is accomplished by transmitting two data frames to remote station 6 at the first time frame and receiving two data frames from remote station 6 at the second time frame. The system can allow for a short transition period between the transmit and receive functions to allow the hardware to adjust. Thus, the efficiency of the data communication system approaches that of the existing CDMA system.

I. Forward Link Transmission Hardware

On the forward link, time gated FDD can be implemented in many embodiments. A system can be designed to specifically perform the functions described herein. In the exemplary embodiment, time gated FDD is implemented using existing hardware which have been designed for a CDMA system in accordance with the IS-95A standard. Several embodiments are described in detail below. Other implementations can be contemplated from the teachings below and are within the scope of the present invention.

Figure 2:
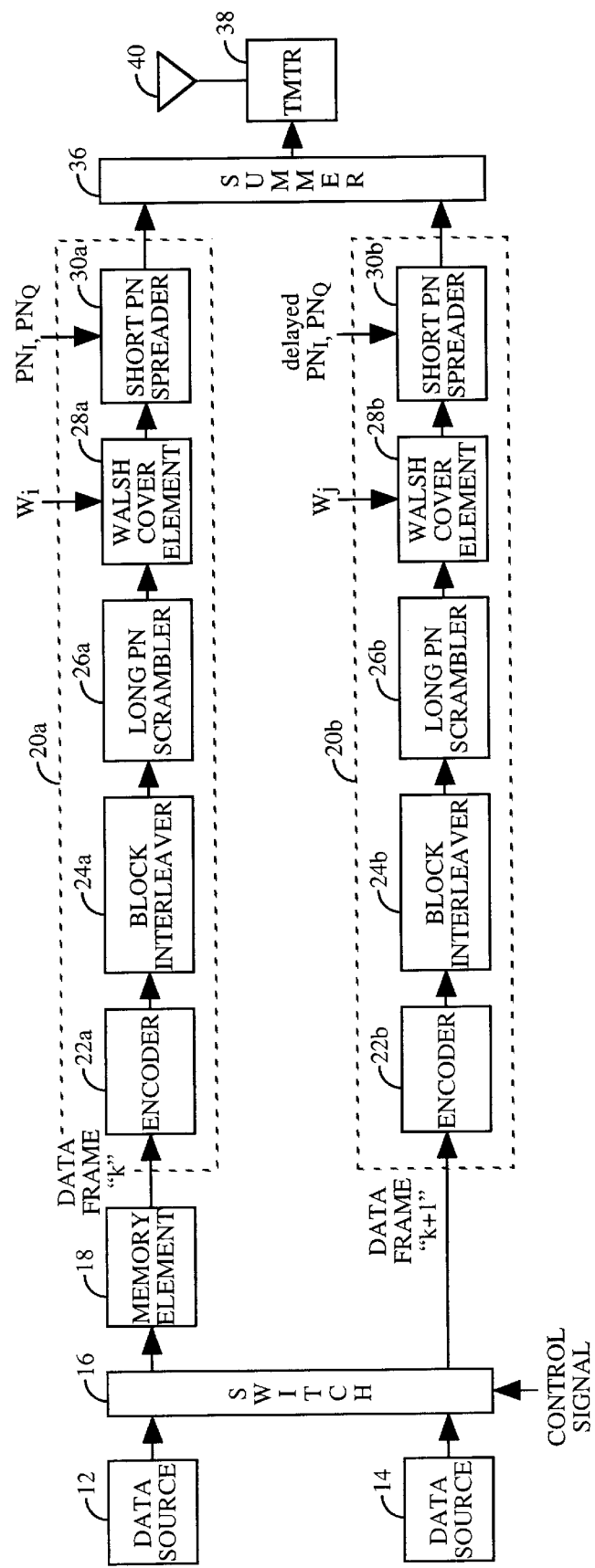
FIG. 2 is an exemplary block diagram of the forward link transmission hardware of the first embodiment.

In the first embodiment, the block diagram illustrating the basic subsystems of the forward link transmission hardware are shown in FIG. 2. Data source 12 contains the data to be transmitted to the first remote station 6. At the first time frame, data frame "k" from data source 12 is routed through switch 16 and provided to memory element 18. Memory element 18 stores the data frame until the next time frame. At the second time frame, the data frame "k" from memory element 18 is provided to Base Station Modulator (BSM) 20a and data frame "k+1" from data source 12 is routed through switch 16 to BSM 20b.

Within each BSM 20, the data frame is provided to encoder 22 which block encodes the data frame with the CRC generator, inserts the set of code tail bits, and convolutionally encodes the formatted data. In the exemplary embodiment, the CRC generator and the convolutional encoder are specified by the IS-95A standard, although other CRC codes and convolutional codes can be used and are within the scope of the present invention. The convolutionally encoded data is provided to block interleaver 24 which reorders the symbols in the encoded data. The interleaved data is provided to long PN scrambler 26 which spreads the data with the long PN code assigned to the destination remote station 6. The long PN scrambling allows only the destination remote station 6, and no other, to descramble the data. The long PN spread data is provided to Walsh cover element 28 which covers the data with the Walsh code corresponding to the traffic channel assigned to the destination remote station 6. The Walsh covered data is provided to short PN spreader 30 which further spreads the data with the short $PN_I$ and $PN_Q$ codes. The short PN spread data from BSMs 20 are provided to summer 36 which combines the data. The combined data is provided to transmitter (TMTR) 38 which filters, modulates, upconverts, and amplifies the signal. The signal is transmitted on the forward link through antenna 40.

In the exemplary embodiment, BSM 20a is assigned with Walsh code $W_i$ and BSM 20b is assigned with Walsh code $W_i$ corresponding to the forward traffic channels used to transmit the data. BSMs 20a and 20b are assigned the same long PN code associated with the first remote station 6 for which the data is destined. However, the long PN code to BSM 20b is delayed by one time frame to align the long PN code with the data. BSM 20a is loaded with the short PN codes and BSM 20b is loaded with the delayed short PN codes (delayed by one time frame). The delay of the long PN code and short PN codes aligns the data with the PN codes and enables proper demodulation at remote station 6.

The above description describes a data transmission from data source 12 to the first remote station 6 at the first time frame. At the next time frame, the same hardware is used to transmit two data frames from data source 14 to the second destination remote station 6. Data source 12 provides data frames to memory element 18 and BSM 20b at alternating time frames. Similarly, data source 14 provides data frames to memory element 18 and BSM 20b at alternating time frames, although staggered by one time frame from data source 12. At alternating time frames, memory element 18 receives data from data sources 12 and 14. Memory element 18 provides buffering of the data frames and one time frame of delay. Memory element 18 can be implemented as a buffer or a circular buffer using RAM or other memory storage devices which are known in the art.

At alternating time frames, BSMs 20 are used to process data frames destined for different remote stations 6. This is possible since the encoding, and block interleaving, spreading, and covering can be performed on a frame by frame basis. For example, the convolutional encoding is performed on one data frame since each data frame is inserted with K–1 code tail bits, where K is the constraint length of the convolutional encoder.

In the exemplary embodiment, BSM 20 is implemented as a custom ASIC. Other implementations of the functions described herein using a microprocessor, a microcontroller, or a digital signal processor are also within the scope of the present invention.

The first embodiment provides several benefits. First, since the buffering is performed on the unprocessed data, the memory requirement of memory element 18 is minimal. In the exemplary embodiment, the unprocessed data is binary and contains up to 288 bits per data frame (20 msec data frame·14.4 kbps). Second, no modification is necessary to BSMs 20 which are designed to perform the functions described herein. However, there are some possible disadvantages. First, some coordination effort is required to multiplex the data processing from two data sources 12 and 14. The Walsh codes, long PN code, and short PN codes need to be properly loaded at the appropriate interval. Second, the design of BSMs 20 may not allow the long PN code to be changed at each time frame. In this case, the destination remote stations 6 can share the same long PN code or the scrambling can be turned off by setting the long PN code to all zeros or all ones.

Figure 3:
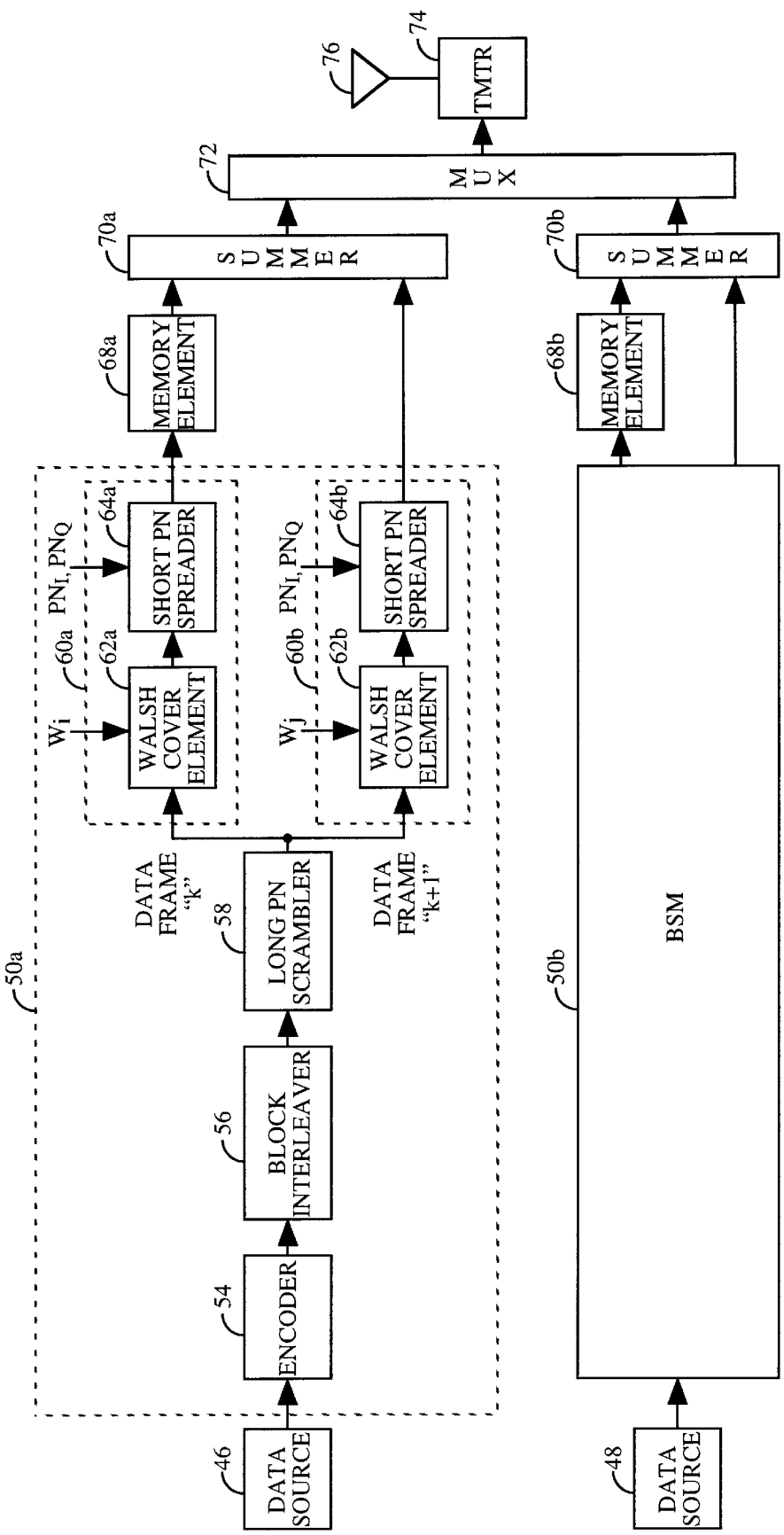
FIG. 3 is an exemplary block diagram of the forward link transmission hardware of the second embodiment.

In the second embodiment, the block diagram illustrating the basic subsystems of the forward link transmission hardware is shown in FIG. 3. Data source 46 contains the data to be transmitted to destination remote station 6. At each time frame, a data frame is provided to encoder 54 which block encodes the data frame with the CRC generator, inserts the set of code tail bits, and convolutionally encodes the formatted data in the manner described in the first embodiment. The convolutionally encoded data is provided to block interleaver 56 which reorders the symbols in the encoded data. The interleaved data is provided to long PN scrambler 58 which spreads the data with the long PN code assigned to the destination remote station 6.

The long PN spread data is provided to modulators 60a and 60b. Within each modulator 60, Walsh cover element 62 covers the data with the Walsh code corresponding to the traffic channel assigned to the destination remote station 6. The Walsh covered data is provided to short PN spreader 64 which further spreads the data with the short $PN_I$ and $PN_Q$ codes. Modulator 60 also performs filtering and gain adjustment of the short PN spread data, although this is not shown in FIG. 3 for simplicity. The modulated data from modulator 60a is provided to memory element 68a which buffers the modulated data and provides one time frame of delay. The modulated and delayed data frame from memory element 68a and the modulated data frame from modulator 60b are provided to summer 70a which combines the modulated data frames. The combined data frames are routed through multiplexer (MUX) 72 and provided to transmitter (TMTR) 74 which modulates, upconverts, filters and amplifies the signal. The signal is transmitted on the forward link through antenna 76. Data transmission from BSM 50a occurs every two time frames. At other time frames, the combined data frames from summer 70b are provided to transmitter 74.

In the second embodiment, the encoding and modulation functions are performed by a single BSM 50 which is implemented as a custom ASIC. BSM 50 can also be implemented with a microprocessor, a microcontroller, or a digital signal processor programmed to perform the function described herein. In the exemplary embodiment, each BSM 50 is designed with a plurality of modulators 60 to support softer handoff by base station 4. In softer handoff, base station 4 provides data transmissions to two sectors simultaneously wherein each data transmission can be defined by different Walsh code and/or different short PN sequences.

In the exemplary embodiment, BSM 50 is assigned the long PN code associated with the remote station 6 for which the data is destined. However, modulator 60a is assigned with Walsh code $W_i$ and modulator 60b is assigned with Walsh code $W_i$ corresponding to the forward traffic channels used to transmit the data. Both modulators 60a and 60b are loaded with the same short $PN_I$ and $PN_Q$ codes. No delay in the short PN codes is necessary, as in the first embodiment, since data is provided sequentially first to modulator 60a and second to modulator 60b.

The second embodiment has some advantages over the first embodiment. First, data transmission using the second embodiment is simple and straightforward. The long PN code, the Walsh codes, and the short PN codes are loaded once and do not need to be changed for the duration of the communication, unless other system parameters changed. Second, currently existing BSM 50 have been designed to perform the functions described above. No new additional hardware, except for memory element 68 and MUX 72, is required. Third, no coordination is necessary to multiplex data transmissions to two remote stations 6. Each BSM 50 is assigned to control the communication with one remote station 6.

The second embodiment has some disadvantages. Because the buffering is performed after the spreading, the required size of memory element 68 is much larger than in the first embodiment. In the exemplary embodiment, each data frame comprises 24,576 symbols representing the 288 data bits. Furthermore, each symbol can comprise multiple bits. The memory requirement of the second embodiment can be over several orders of magnitude greater than that of the first embodiment.

Figure 4:
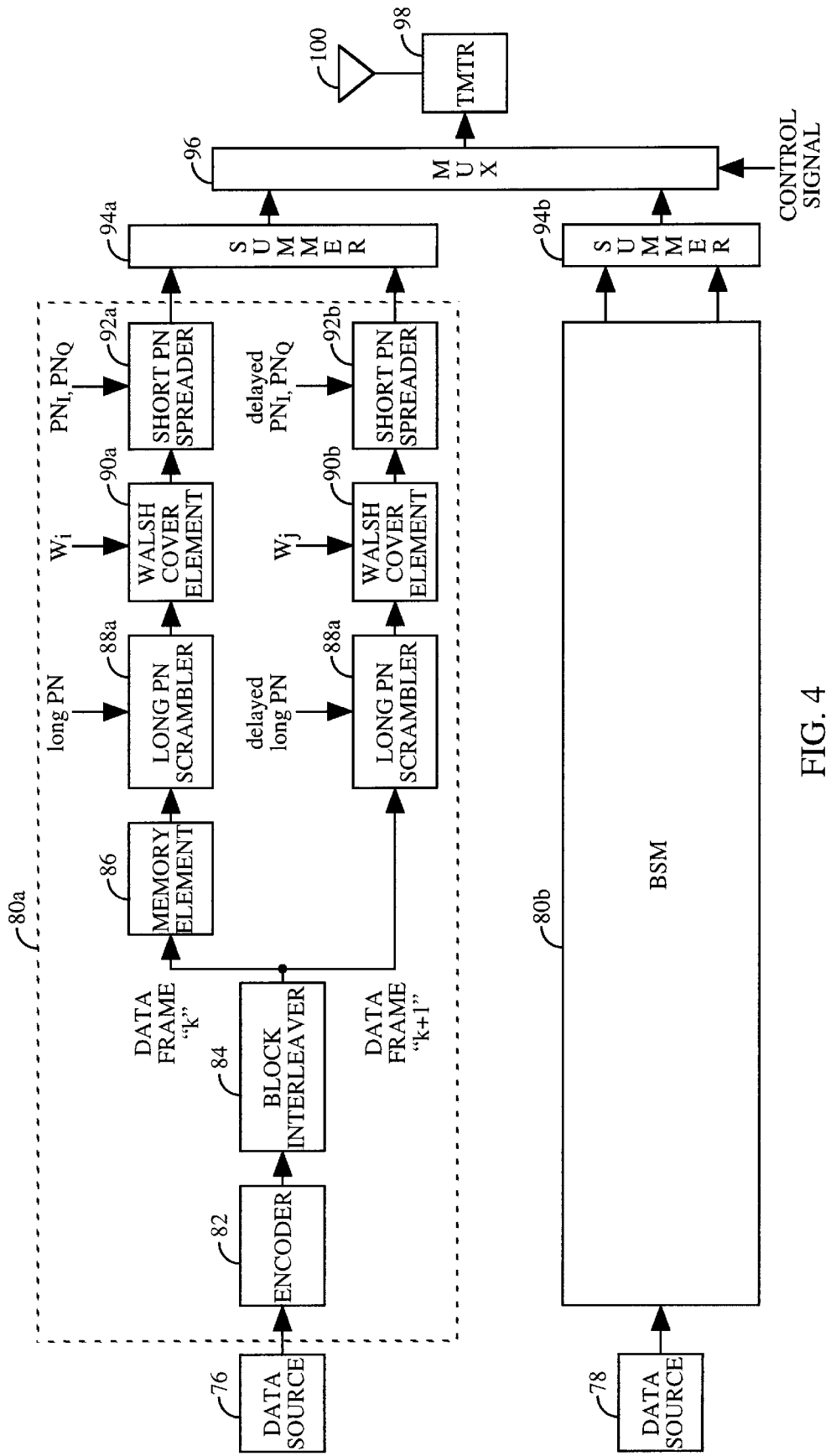
FIG. 4 is an exemplary block diagram of the forward link transmission hardware of the third embodiment.

Other embodiments can also be implemented to perform the functions disclosed herein. The hardware can be designed to combine the benefits of the first and second embodiment described above. An exemplary block diagram of the third embodiment is shown in FIG. 4. Data from data source 76 is provided to BSM 80a. Within BSM 80, encoder 82 encodes the data and block interleaver 84 reorders the encoded data as described above. The interleaved data is provided to memory element 86 which buffers the data and provides one time frame of delay. The buffered data is provided to long PN scrambler 88a and the interleaved data is provided to long PN scrambler 88b. Long PN scrambler 88, Walsh cover element 90, and short PN spreader 92 perform the spreading and covering functions as described above. The spread data is combined by summer 94a and the combined data is routed through multiplexer (MUX) 96 and provided to transmitter 98. The data is processed by transmitter 98 and transmitted on the forward link through antenna 100 in the manner as described above. As in the second embodiment, data transmissions occur alternately from BSMs 80a and 80b.

In the third embodiment, long PN scramblers 88 can be loaded with the proper long PN sequences, Walsh cover elements 90 can be loaded with the proper Walsh codes, and short PN spreaders 92 can be loaded with the proper short PN codes as shown in FIG. 4. This embodiment allows for long PN scrambling which may not be possible in the first two embodiments due to hardware limitation. Furthermore, placing memory element 86 before the long PN scrambling minimize the memory requirement of memory element 86. Finally, each remote station 6 can be assigned to a single BSM 80 to provide ease of use and eliminate the need for coordination.

II. Forward Link Transmission Format

Figure 5:
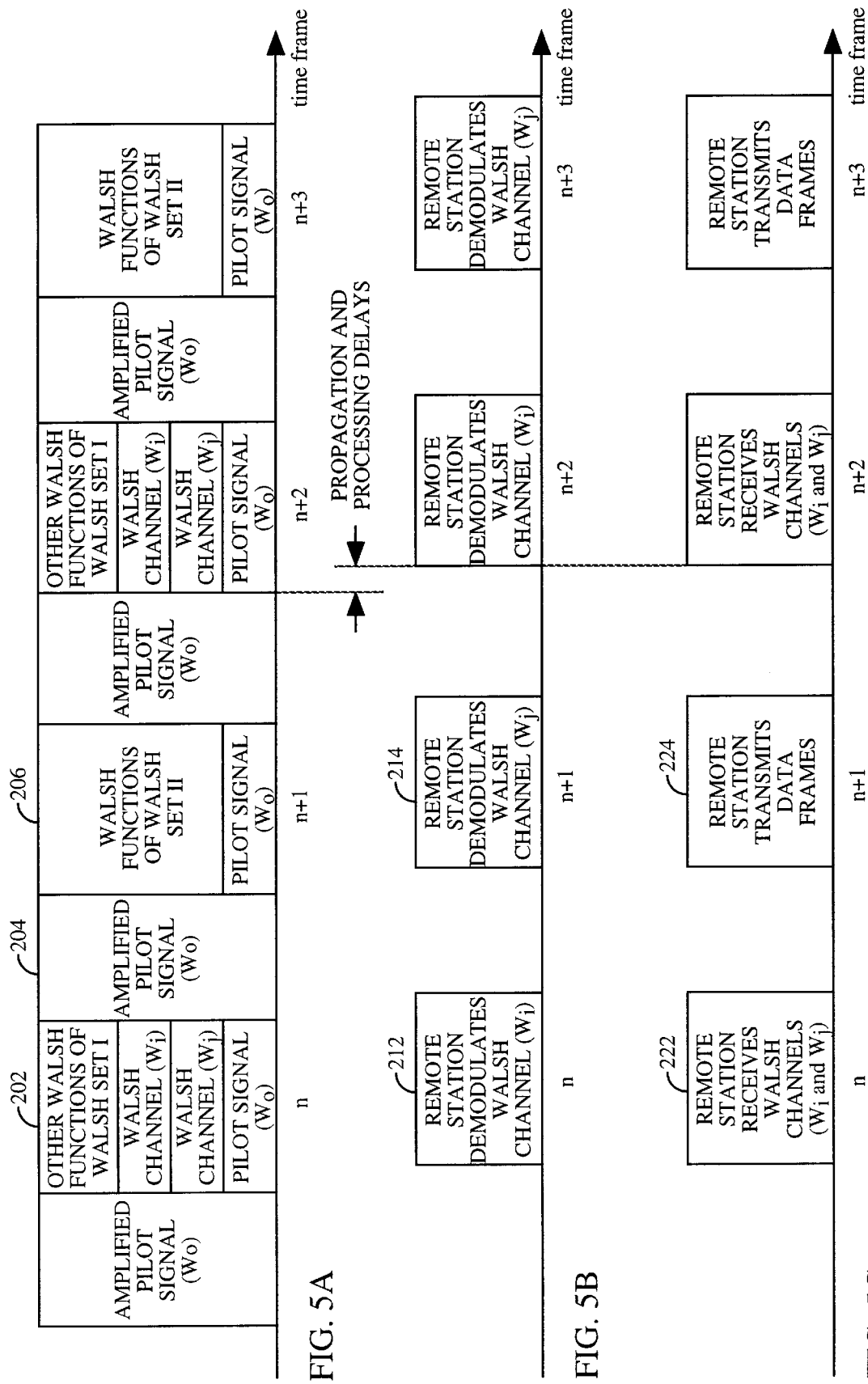
FIGS. 5A–5C are exemplary timing diagrams of the forward link data transmissions by the base station, forward link data demodulation by the remote station, and forward link data reception and reverse link data transmission by the remote station, respectively.

An exemplary timing diagram illustrating the forward link data transmission is shown in FIG. 5A. Data transmissions on the forward link can be identified by three events. At time frame n, base station 4 transmits data to the first remote station 6, in block 202. The forward link transmission includes the pilot signal which is covered with Walsh code $W_0$, the first data frame which is covered with Walsh code $W_i$, the second data frame which is covered with Walsh code $W_j$, and other data which can be covered with other Walsh codes in Walsh set I. In the exemplary embodiment, Walsh set I contains the Walsh codes assigned to the first remote station 6. The data frames on Walsh channel $W_i$, $W_j$, and the other data transmitted on Walsh set I is directed at the first remote station 6. Within time frame n, base station 4 can transmit additional data using the remaining unassigned Walsh codes to other remote stations 6, although this is not shown in FIG. 5A for simplicity.

At time frame n+1, base station 4 transmits data to the second remote station 6, at block 206. The forward link transmission includes the pilot signal which is covered with Walsh code $W_0$ and other data which is covered with the Walsh codes in Walsh set II. The first remote station 6 does not demodulate the data frames transmitted in this time frame. However, the first remote station 6 can continue to receive the pilot signal transmitted using Walsh code $W_0$.

In the present invention, base station 4 can transmit an amplified pilot signal for a short duration between successive time frames, in block 204. Transmission of the amplified pilot signal allows the hardware to reliably lock to the pilot signal and to prepare for demodulation of the upcoming data transmission. In the exemplary embodiment, the duration of the pilot signal transmission can be several msec, although any time period of zero msec or greater can be used and is within the scope of the present invention.

In this specification, the memory elements provide buffering and one time frame of delay. Furthermore, the BSMs can be loaded with the delayed long PN code and the delayed short PN codes. As used in these context, one time frame of delay includes the transition period wherein base station 4 transmits the amplified pilot signal, although this is not explicitly stated in the above discussion for simplicity.

III. Forward Link Receiver Hardware

Figure 6:
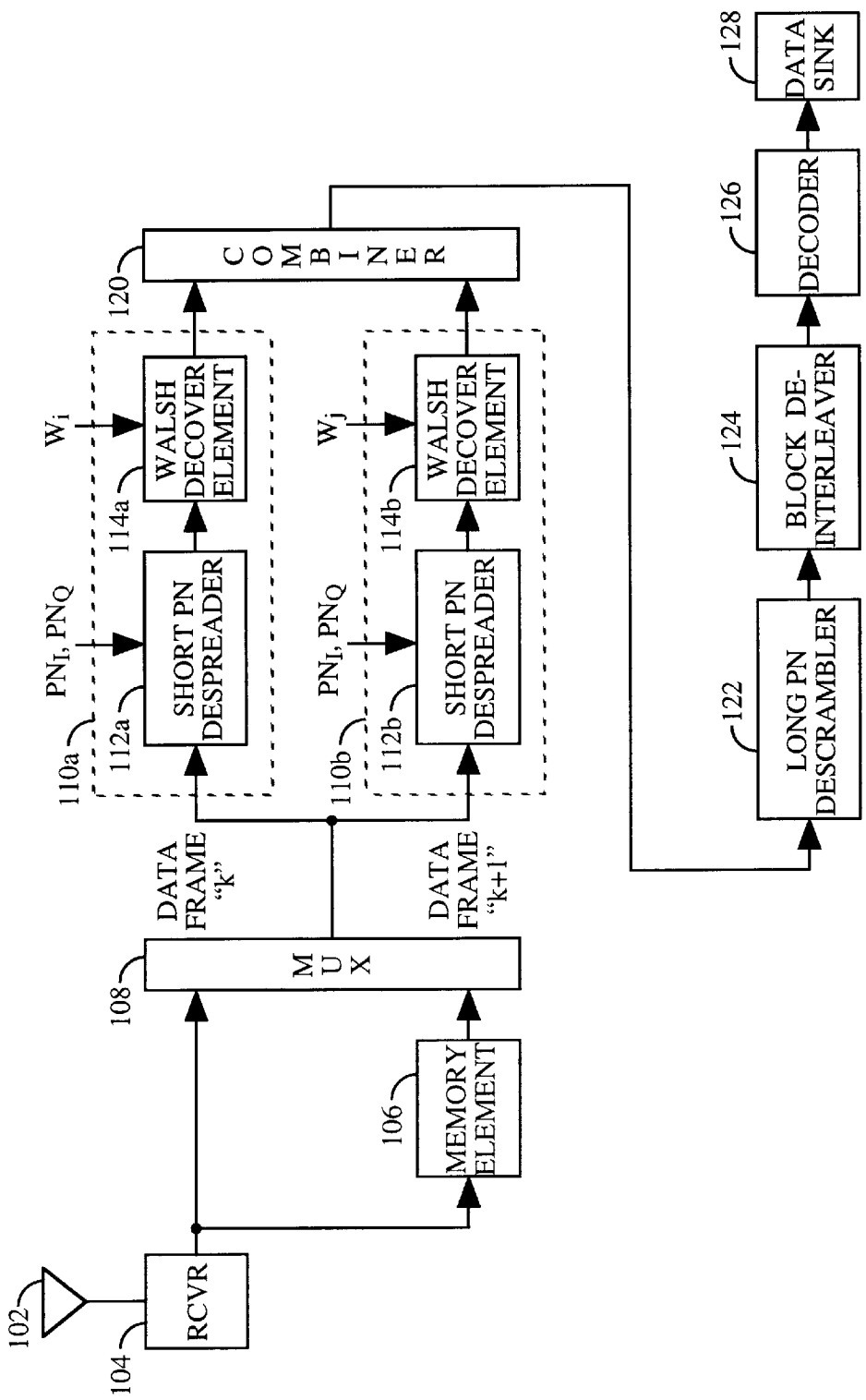
FIG. 6 is an exemplary block diagram of the forward link receiver hardware.

An exemplary block diagram illustrating the basic subsystems of the forward link receiver hardware is shown in FIG. 6. The receiver hardware resides within remote station 6. The forward link signal is received by antenna 102 and provided to receiver (RCVR) 104. Receiver 104 amplifies, filters, downconverts, and samples the signal to obtain the digitized baseband I and Q signals. The baseband signals are provided concurrently to memory element 106 and multiplexer (MUX) 108. Memory element 106 buffers the baseband signals and provides one time frame of delay. The delayed baseband signals are provided to MUX 108. At the first time frame MUX 108 provides data frame "k" to a bank of correlators 110 and at the second time frame MUX 108 provides data frame "k+1" to the same bank of correlators 110.

In the exemplary embodiment, at least one correlator 110 is assigned to the baseband signals for each data frame. Correlators 110 can be assigned to distinct signal paths of the same data frame to provide a more reliable demodulation of the received signal.

In the present invention, each assigned correlator 110 is loaded with the same short PN codes and the unique Walsh code corresponding to the data frame being received. For example, correlator 110a is assigned to demodulate data frame "k". Thus, Walsh decover element 114a is loaded with Walsh code $W_i$ corresponding to the Walsh code used to cover data frame "k" at base station 4. Similarly, correlator 110b is assigned to demodulate data frame "k+1" and Walsh decover element 114b is loaded with Walsh code $W_j$. Short PN spreaders 112 are loaded with the same short $PN_I$ and $PN_Q$ codes. No delay of the short PN codes is necessary since the data is provided sequentially first to correlator 110a and second to correlator 110b.

In the exemplary embodiment, Walsh decover elements 114 can be loaded with different Walsh codes by placing remote station 6 in soft handoff mode. In this mode, remote station 6 can demodulate multiple transmissions from multiple base stations 4 wherein each base station 4 can transmit using different short PN sequences and different Walsh codes. Remote station 6 is designed with the ability to load each correlator 110 with any Walsh code and any short PN sequences.

Within each correlator 110, the baseband signals are provided to short PN despreader 112 which despreads the signal with the short PN codes. The despread data is provided to Walsh decover element 114 which decovers the data with the Walsh code assigned to that correlator 110. The decovered data is provided to combiner 120 which combines the data from the assigned correlators 110. The combined data from combiner 120 is provided to long PN descrambler 122 which despreads the data with the long PN code. The despread data is provided to block de-interleaver 124 which reorders the symbols within the despread data. The de-interleaved data is provided to decoder 126 which performs the Viterbi decoding and CRC check. The CRC checked data is provided to data sink 128.

In the exemplary embodiment, combiner 120 combines the decovered data from each assigned correlator 110 which exceeds a predetermined threshold. At the first time frame, correlators 110a and 110b both demodulate data frame "k". However, data frame "k" is covered with Walsh code $W_i$ and only correlator 110a outputs a valid demodulated data frame. Correlator 110b decovers the same data with Walsh code $W_j$ and the result is an uncorrelated signal which most likely falls below the predetermined threshold. Thus, the output of combiner 120 is only the demodulated data from correlator 110a. At the second time frame, data frame "k+1" which was covered with Walsh code $W_j$ can only be demodulated by correlator 110b. Correlator 110a outputs an uncorrelated signal which most likely falls below the predetermined threshold and will not be combined with the output from correlator 110b. Thus, although both correlators 110a and 110b are active continuously, the outputs from these correlators 110 are valid only when the correct data frame is being demodulated. This configuration allows for a simple demodulation scheme using existing hardware and without special coordination efforts.

In the exemplary embodiment, the demodulation hardware comprising correlators 110 and combiner 120 are implemented within a Mobile Station Modulator (MSM) ASIC which is used in an IS-95A CDMA system. When operating in the soft handoff mode, each correlator 110 within the MSM can be assigned with different Walsh code and short PN sequences. Thus, no modification of the MSM is necessary to demodulate the time gated FDD waveform as described herein. Other implementations to perform the demodulation can be contemplated and are within the scope of the present invention.

The timing diagram of the demodulation of the forward link signal is illustrated in FIG. 5B. At time frame n, base station 4 transmits two data frames on Walsh channels $W_i$ and $W_j$. Shortly thereafter, remote station 6 receives the two data frames. At time frame n (using the time base of remote station 6), remote station 6 demodulates the data frame transmitted on Walsh channel $W_i$ which corresponds to the earlier transmitted data frame (or data frame "k"). This is illustrated by block 212. At time frame n+1, remote station 6 demodulates the data frame transmitted on Walsh channel $W_j$ (or data frame "k+1"). This is illustrated by block 214. The process repeats for each set of transmitted data frames.

IV. Reverse Link Transmission Hardware

Time gated FDD data transmission from remote station 6 to base station 4 can be implemented in many embodiments. The implementation can be dependent on the architecture employed for the reverse link data transmission. For example, the IS-95A standard defines an architecture wherein data transmission is defined in accordance with an offset of the long PN sequence. At two differing offsets, the modulated signals are uncorrelated. Thus, demodulation of the reverse link signal with an incorrect offset results in a minimal value at the output. The IS-95A reverse link does not use the Walsh channel architecture of the forward link.

Figure 7:
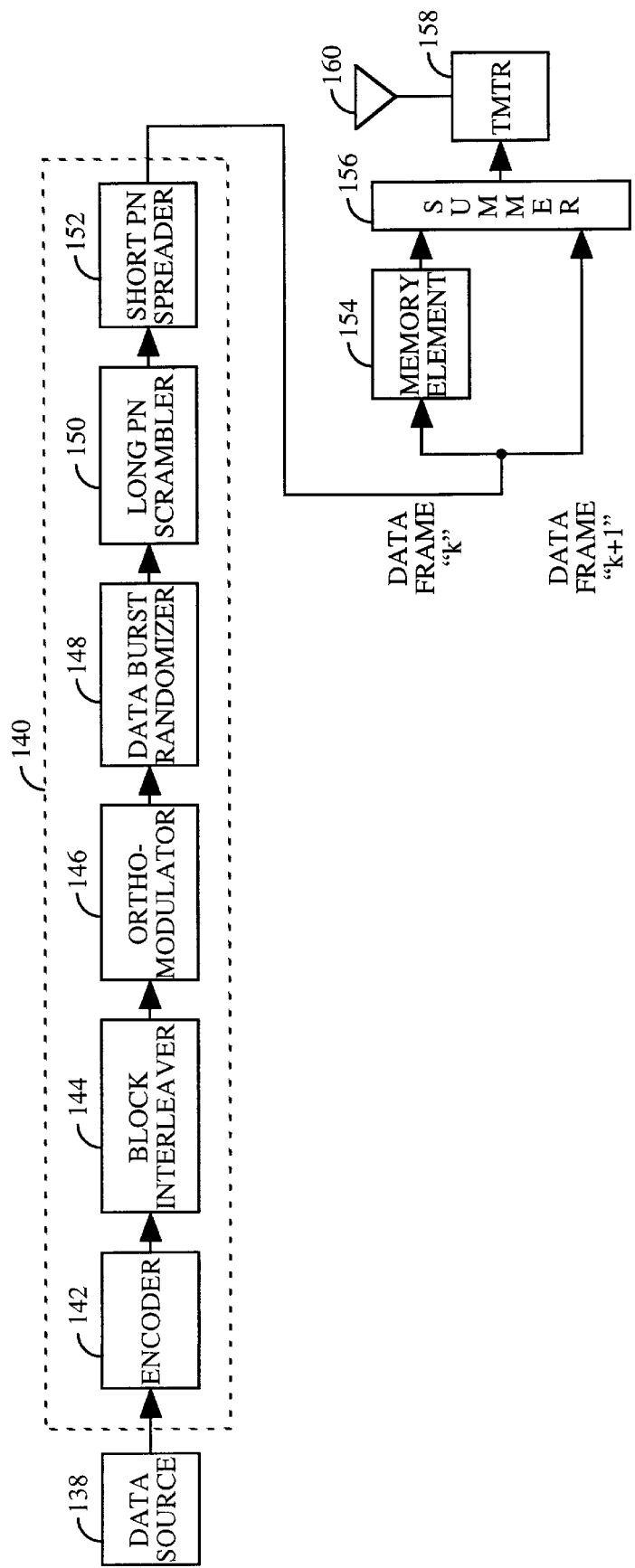
FIG. 7 is an exemplary block diagram of the reverse link transmission hardware.

An exemplary block diagram illustrating the basic subsystems of the reverse link transmission hardware is shown in FIG. 7. Data source 138 contains the data to be transmitted to base station 4. At each time frame, one data frame is provided to MSM 140. Within MSM 140, encoder 142 block encodes the data frame with the CRC generator, inserts the set of code tail bits, and convolutionally encodes the formatted data. The convolutionally encoded data is provided to block interleaver 144 which reorders the symbols in the encoded data. The interleaved data is provided to ortho-modulator 146 which maps the data into a second signal space using Walsh code mapping. Specifically, the input sequence is grouped into groupings of six bits. Each 6-bit grouping selects a unique 64-chip Walsh sequence. The mapped signal from ortho-modulator 146 is provided to data burst randomizer 148 which randomly deletes the data (or replace the data with zero) under the appropriate circumstances. Thus, data burst randomizer 148 turns off transmitter (TMTR) 158 when remote station 6 is transmitting at less than full rate to reduce the transmit power. The randomized data is provided to long PN scrambler 150 which spreads the data with the long PN code assigned to remote station 6. The long PN spread data is provided to short PN spreader 152 which further spreads the data with the short $PN_I$ and $PN_Q$ codes. Filtering of the short PN spread data and gain adjustment of the filtered data are also performed, although this is not shown in FIG. 7 for simplicity.

The modulated data from short PN spreader 152 is provided to memory element 154 which buffers the modulated data and provides one time frame of delay. The modulated and delayed data frame from memory element 154 and the modulated data frame from short PN spreader 152 are provided to summer 156 which combines the modulated data frames. The combined data frame is provided to transmitter (TMTR) 158 which modulates, upconverts, filters and amplifies the signal. The signal is transmitted on the reverse link through antenna 160. Although not shown in FIG. 7, data transmission occurs every two time frames. At other time frames, transmitter 158 is turned off by shutting off transmitter 158 or providing transmitter 158 with zero values.

In the exemplary embodiment, the encoding and modulation functions are performed by MSM 140 which is implemented as a custom ASIC. MSM 140 can also be implemented with a microprocessor, a microcontroller, or a digital signal processor programmed to perform the function described herein.

As described above, placing memory element 154 after the short PN spreader 152 dictates the need for a larger memory element 154. MSM 140 can be modified to allow placement of memory element 154 before long PN descrambler 150 (or before ortho-modulator 146) to reduce the memory requirement. Moving memory element 154 toward data source 138 necessitates the need to duplicate the signal processing blocks after the memory element. For example, if memory element 154 is located before long PN scrambler 150, then long PN scrambler 150 and short PN spreader 152 (plus the subsequent filtering and gain block) are duplicated to allow concurrent transmissions of two data frames. Note that concurrent scrambling of two data frames requires that each long PN scrambler 150 be loaded with the proper long PN sequence (e.g. having the proper offset) and each short PN spreader 152 be loaded with the proper short PN sequences.

The timing diagram of data transmission of the reverse link signal is illustrated in FIG. 5C. At time frame n, base station 4 transmits two data frames on Walsh channels $W_i$ and $W_j$ at block 202. At time frame n (using the time base of remote station 6), remote station 6 receives the data frames, at block 222. At time frame n+1, remote station 6 transmits two data frames to base station 4 as illustrated by block 224. During time frame n+1, remote station 6 demodulates the data frame stored in the memory element as shown by block 214 in FIG. 5B. The demodulation of the data frame at block 214 does not have an impact on the transmission at block 224 since, in the exemplary embodiment, the functions are performed by independent hardware.

V. Reverse Link Receiver Hardware

Base station 4 can receive time gated FDD data transmission from remote station 6 in a manner similar to the demodulation performed by remote station 6 and illustrated in FIG. 6. The received reverse link signal is processed and digitized into the I and Q baseband signals. Base station 4 then demodulate the first data frame at time frame n and the second data frame at time frame n+1. In an alternative embodiment, base station 4 can concurrently demodulate both data frames with two demodulators.

VI. Alternative Embodiments

Although the present invention is described in the context of a communication between one base station 4 and two remote stations 6, the concept can be extended to cover communication between multiple base stations 4 and multiple remote stations 6. For example, remote stations 6 can be divided into two sets of remote stations 6. At the first time frame, the base stations 4 transmit to the first set of remote stations 6 and receive transmissions from the second set of remote stations 6. At the second time frame, base stations 4 transmit to the second set of remote stations 6 and receive transmissions from the first set of remote stations 6. Data transmissions to the two sets of remote stations 6 can alternate over consecutive time frames.

The concept of the present invention can be further extended to transmissions to multiple (two or more) sets of remote stations 6. At each time frame, base stations 4 transmits to one or more sets of remote stations 6 and receive transmissions from one or more sets of remote stations 6 which are not receiving data. Because of the time gating feature of the present invention, base stations 4 do not concurrently transmit and receive from the same remote station 6 at any one time frame.

As a further extension of the present invention, base stations 4 can transmit to remote station 6 at every 1, 2, 3, 4, . . . or N time frames. Furthermore, base stations 4 can transmit to remote stations 6 on a non-periodic manner (e.g. as data becomes available). In this case, remote stations 6 may need to be informed concurrently or prior to the data transmission. Alternatively, because of the CRC encoding, remote stations 6 can perform the CRC check of the received data frames and retain data frames which pass the CRC check. These embodiments provide great flexibility and allow the system to transmit and receive according to the need of the users.

The present invention has been described in the context of transmission of two data frames per time frame. This implementation provides data transmission capability approaching the nominal rate of the CDMA system wherein one data frame is transmitted at each time frame. The present invention can be further extended to allow transmissions of 0, 1, 2, 3 or more data frames per time frame to provide greater flexibility and increased capacity. The number of data frames which can be concurrently transmitted and received is limited by the hardware implementation.

VII. Other Considerations

The use of soft handoff as described in the aforementioned U.S. Pat. No. 5,101,501 and U.S. Pat. No. 5,267,261 may be impacted by the availability of hardware in the present invention. On the forward link, reception of the multiple transmissions during soft handoff may be impacted by the number of correlators available for demodulation. In the exemplary embodiment, each remote station 6 contains three or four correlators. At least one correlator is used to demodulate each received data frame. Additional available correlators can be allocated to demodulate other signal paths to improve the demodulation. A demodulator can be designed with additional correlators to perform the demodulation of many data frames from multiple signal paths. The present invention is directed to the use of any number of correlators necessary for satisfactory demodulation of the requisite number data frames from the requisite number of signal paths.

If the number of correlators is limited and/or the quality of the received signal is poor, the demodulator can be configured to demodulate less than all transmitted data frames. The extra correlators can be allocated to multiple signal paths of the received data frame. The data frame not demodulated and the data frame received in error can be retransmitted at a subsequent time frame.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A circuit for data reception using time gated frequency division duplexing comprising:

a receiver for providing data frames to a first input of a multiplexer and to a memory element;

said memory element connected to said receiver for storing said data frames and for providing said stored data frames to a second input of said multiplexer;

said multiplexer for multiplexing said data frames from said receiver and said delayed data frames from said memory element, and providing said multiplexed data frames to a first correlator and a second correlator;

said first correlator for decovering said multiplexed data frames with respect to a first Walsh code;

said second correlator for decovering said multiplexed data frames with respect to a second Walsh code; and a combiner connected to said first correlator and to said second correlator for combining said first decovered data frames with said second decovered data frames.

2. The circuit of claim 1 wherein each correlator comprises:

a Walsh decover element; and wherein each Walsh decover element within said plurality of correlators is assigned with a unique Walsh code.

3. The circuit of claim 2 wherein each correlator further comprises:

a short PN despreader connected to said Walsh decover element, said short PN despreader loaded with $PN_I$ and $PN_Q$ codes.

4. The circuit of claim 3 wherein said memory element provides one time frame of delay.

5. A method for data transmission using time gated frequency division duplexing comprising:

generating a first data frame from a first data source;

generating a second data frame from said first data source;

storing said first data frame in a memory element;

encoding said first data frame with a first modulator to generate a first encoded data frame;

encoding said second data frame with a second modulator to generate a second encoded data frame; and combining said first and second encoded data frames.

6. The method of claim 5 wherein each encoding step comprises the step of:

Walsh covering a data frame with a Walsh code to provide a Walsh covered data frame; and wherein said Walsh code for said first data frame is unique from said Walsh code for said second data frame.

7. The method of claim 6 wherein each encoding step further comprises the step of:
spreading said Walsh covered data frame with $PN_I$ and $PN_Q$ codes; and
wherein said $PN_I$ and $PN_Q$ codes for said second data frame is delayed from said $PN_I$ and $PN_Q$ codes for said first data frame.

8. The method of claim 7 wherein said storing step provides one time frame of delay.

9. The method of claim 8 wherein said data frames are 20 msec in duration.

10. A circuit for data transmission using time gated frequency division multiplexing, comprising:
a first data source for generating a first set of data frames and providing said first set of data frames to a switch;
a second data source for generating a second set of data frames and providing said second set of data frames to said switch;
said switch coupled to said first data source and to said second data source for switching said first set of data frame and said second set of data frames to a memory element and a second modulator;
said memory element coupled to said switch for storing said data frames from said switch;
said first modulator coupled to said memory element for modulating said first set of data frames for transmission to a first receiver;
said second modulator coupled to said switch for modulating said second set of data frames for transmission to a second receiver; and
a summer coupled to said first and second modulators for combining said first modulated set of data frames and said second set of modulated data frames.

11. The circuit of claim 10, wherein each modulator comprises a Walsh cover element for covering said data frames, and wherein each Walsh cover element is assigned with a unique Walsh code.

12. The circuit of claim 2 wherein each base station modulator further comprises
a short PN spreader connected to said Walsh cover element; and
wherein said short PN spreaders within said base station modulators connected to said at least one memory element are loaded with $PN_I$ and $PN_Q$ codes and said short PN spreaders within said base station modulators connected to said switch are loaded with delayed $PN_I$ and $PN_Q$ codes.

13. The circuit of claim 12 wherein said memory element provides one time frame of delay.

14. The circuit of claim 13 wherein said data frames are 20 msec in duration.

15. The circuit of claim 11 wherein each modulator further comprises:
a short PN spreader connected to said Walsh cover element, said short PN spreader loaded with $PN_I$ and $PN_Q$ codes.

16. A circuit for data transmission using time gated frequency division duplexing, comprising:
a first data source for generating a first set of data frames to a first modulator;
a second data source for generating a second set of data frames to a second modulator;
said first modulator coupled to said first data source for modulating said first set of data frames to produce a first modulated set of data frames and a second modulated set of data frames for transmission to a first receiver;
said second modulator coupled to said second data source for modulating said second set of data frames to produce a third modulated set of data frames and a fourth modulated set of data frames for transmission to a second receiver;
a first memory element coupled to a first output of said first modulator for delaying said first modulated set of data frames;
a second memory element coupled to a first output of said second modulator for delaying said third modulated set of data frames;
a first summer coupled to an output of said first memory element and to a second output of said first modulator, said second output for providing said second modulated set of data frames to said first summer, said first summer for combining said delayed first set of data frames from said first memory element with said second modulated set of data frames to produce a fifth set of data frames;
second summer coupled to an output of said second memory element and to a second output of said second modulator, said second output of said second modulator for providing said third modulated set of data frames to said second summer, said second summer for combining said delayed third set of data frames from said second memory element with said fourth modulated set of data frames to produce a sixth set of data frames; and
a multiplexer coupled to an output of said first summer and to an output of said second summer, said multiplexer for multiplexing said fifth set of data frames and said sixth set of data frames to a transmitter.

* * * * *